Figure 6:
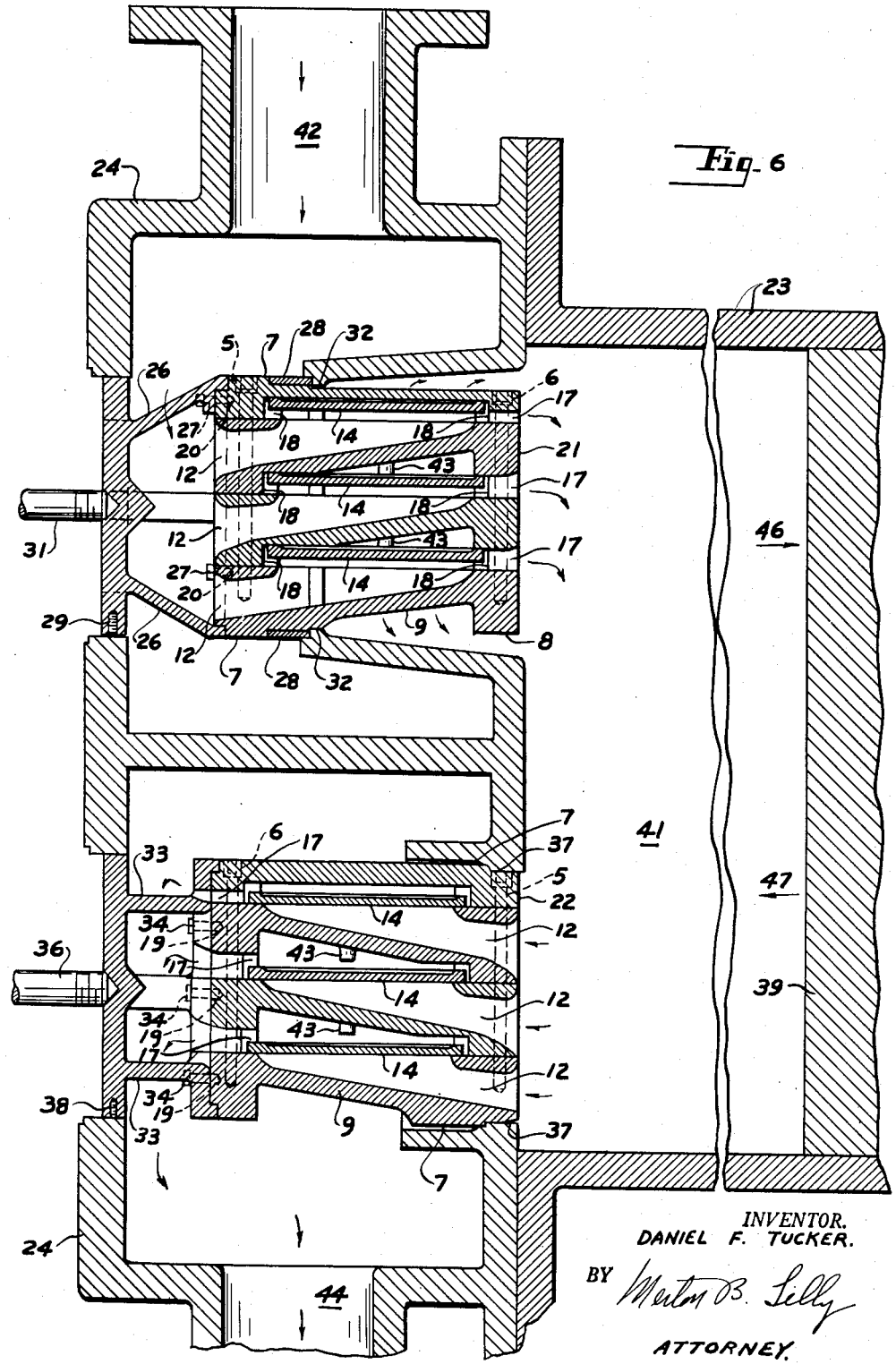

Nov. 9, 1954  D. F. TUCKER  2,693,818
MULTIPLE PLATE VALVE
Filed Dec. 26, 1951  2 Sheets-Sheet 1
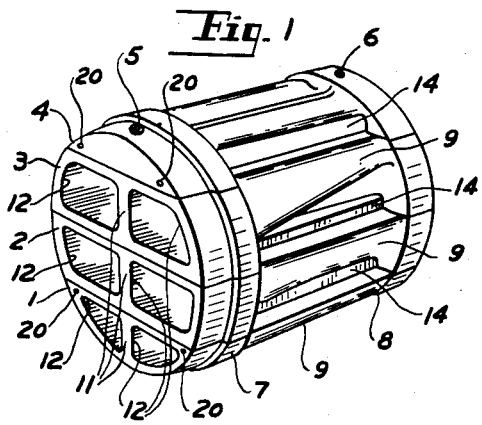
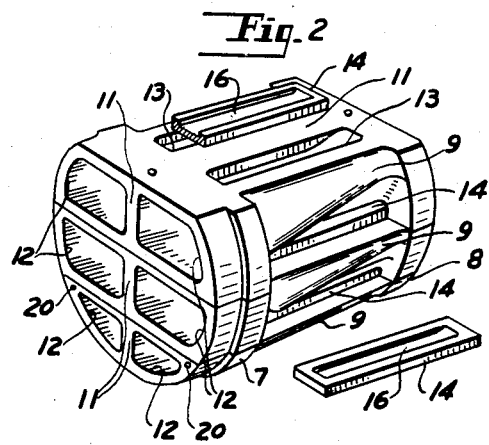
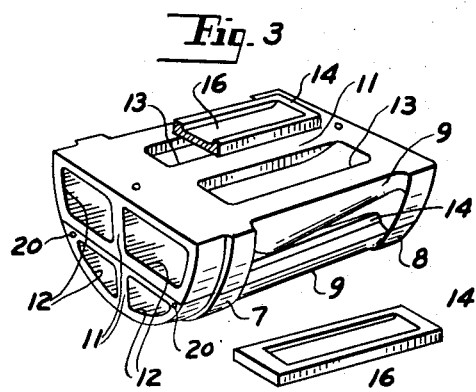
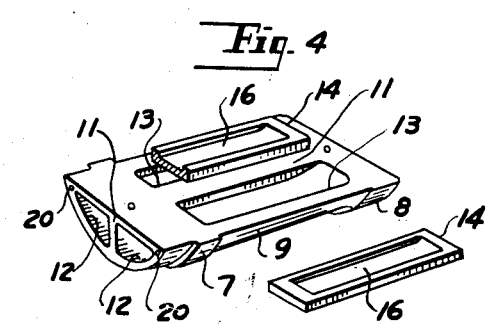
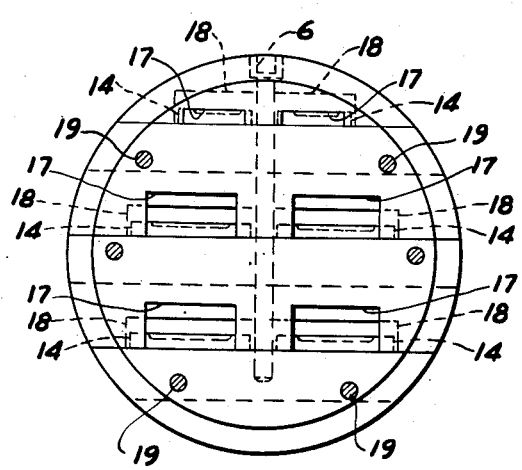
INVENTOR.
DANIEL F. TUCKER.
BY
ATTORNEY.

Nov. 9, 1954  D. F. TUCKER  2,693,818
MULTIPLE PLATE VALVE
Filed Dec. 26, 1951  2 Sheets-Sheet 2

INVENTOR.
DANIEL F. TUCKER.
BY *Merton B. Lilly*
ATTORNEY.

# United States Patent Office 2,693,818
Patented Nov. 9, 1954

2,693,818

MULTIPLE PLATE VALVE

Daniel F. Tucker, Wyandotte, Mich., assignor to Wyandotte Chemicals Corporation, Wyandotte, Mich., a corporation of Michigan Application December 26, 1951, Serial No. 263,333

1 Claim. (Cl. 137—454.4)

The present invention relates to an automatic nonreturn valve of the kind which in the fully open position provides a plurality of passages permitting the flow of a fluid medium therethrough without substantial change of direction, and suitable for use, for example, in gas compressors.

In the operation of a two-cycle, piston-type gas compressor, it is necessary to use an automatic nonreturn check valve which is in an open position during one stroke and in a closed position during the second stroke. Practical considerations in the design of such compressors dictates that the fluid medium must pass through such a valve without substantial change of direction. In the past, conventional-type reed valves, such as those disclosed in U. S. Patent No. 1,632,155, have been used for this purpose. The reed-type valve has not been satisfactory for this purpose in that the reeds are necessarily thin and frequently break under the severe use conditions to which they are exposed. The cost of replacing such reeds is substantial, due not only to the labor involved in replacing the reed, but also the fact that while the valves are being replaced the gas compressor is inoperable.

It is an object of this invention to provide an automatic nonreturn check valve of rugged construction.

Another object is to provide an improved valve in which the fluid medium pass therethrough without substantial change of direction.

A further object is to provide a valve that can be readily dismantled and repaired.

Other objects and advantages of the present invention will become apparent from the following detailed description thereof when read in conjunction with the accompanying drawings, in which Fig. 1 is a perspective view of a valve comprising the present invention taken from the inlet end thereof, Figs. 2–4, inc., are perspective views of the valve shown in Fig. 1 taken from the inlet end thereof and showing various stages of assembly, Fig. 5 is a side elevation view taken from the discharge end thereof, and Fig. 6 is a sectional view of two valves of the types shown in Fig. 1 in operable assembly with a piston-type gas compressor.

An automatic nonreturn valve of rugged construction has been invented in which the fluid medium passes therethrough without an over-all net change of direction. The present valve is characterized in that the inlets and the discharge ports thereof are in planes substantially parallel to one another although gravity seated valve plates employed as closure members in the valves operate in a direction substantially perpendicular to the direction of the fluid flow through the valve.

The valve is essentially composed of valve body members 1, 2 and 3 and covering member 4 which are assembled by means of tie bolts 5 and 6. Circumferential members 7 and 8 are seating means for positioning the valve, as shown in Fig. 6. Valve bodies 1, 2 and 3 each contain 2 valve ducts 9—9 which are separated by dividing walls 11—11 and have inlets 12—12 and outlets 13—13 shown in Figs. 2–4, inclusive. Valve plates 14—14 cover outlets 13—13 and have centers 16—16 which are hollowed out to reduce the weight of the plates. In Figs. 2–4, inc., one valve plate 14 is shown removed and another in broken view so that outlets 13—13 and dividing walls 11—11 can be seen. In the inlet end of the valve and in valve body 1 and covering member 4 are threaded holes 20—20 which are used in conjunction with a spider to position the valve in the cylinder head as shown in Fig. 6.

Fig. 5 shows a side elevation view of the discharge end of the valve. Ports 17—17 serve as discharge outlets when the assembled valve is enclosed in a cylindrical sleeve and sealed by seating members 7 and 8. In the view shown, the valve plates 14—14 are covering the discharge outlets 13—13 of valve ducts 9—9. Valve guideways 18—18 are provided in valve bodies 2 and 3 and covering member 1 which serve as guide and stop means for the valve plates 14—14 when they are opened by pressure in the valve ducts 9—9, as shown in valve 21 of Fig. 6. Threaded holes 19—19 are provided in the discharge end of the valve bodies 1, 2 and 3 by means of which a spider is attached to position the valve in a cylinder head as shown in Fig. 6.

Fig. 6 is a sectional view of an inlet valve 21 and a discharge valve 22 in operable assembly with a reciprocating piston type gas compressor 23. Inlet valve 21 is positioned in cylinder head 24 by means of a 4-ribbed spider 26 which is attached to the valve by means of threaded bolts 27—27 which are secured in threaded holes 20—20. A ring 28 positions valve 21 entirely within the cylinder head 24. and a threaded dowel 29 is inserted into the spider 26 and prevents rotation of the spider and inlet valve 21. A screw 31 threadedly engages a valve cover (not shown) and exerts pressure on the spider 26, seating means 7 and positioning ring 28 forcing them against flange 32 and thus securely seating valve 21 in cylinder head 24. Discharge valve 22 if fastened to a 6-ribbed spider 33 by means of threaded bolts 34—34 which pass through the spider 33 and into the threaded holes 19—19. A bolt 36 threadedly engages a valve cover (not shown) so that rotation of the bolt 36 causes it to move forward against the spider 33. This forces the seating means 7 into pressure-tight engagement with flange 37 of the cylinder head 24. A threaded dowel 38 is positioned in spider 33 and prevents the rotation of the spider and valve 22 which is attached thereto.

As shown in Fig. 6, a piston 39 is moving away from the valves, in the direction shown by the arrow 46 during the inlet cycle, thus reducing the pressure in cylinder 41. Gas from a source not shown passes through an inlet chamber 42 of the cylinder head and into valve inlets 12—12 of valve assembly 21. The pressure differential between the cylinder 41 and the inlet chamber 42 raises valve plates 14—14 to the open position shown in valve 21 and the gas enters cylinder 41 as shown by the small arrows. The plate stops 43—43 prevent any undue bending of valve plates 14—14. Throughout the inlet stroke the discharge valve 22 is closed since gravity and discharge pressure in chamber 44 of the cylinder head seat valve plates 14—14 as shown.

When the compression stroke begins, the piston moves toward the valves in the direction shown by the arrow 47 and the pressure in cylinder 41 exceeds that in inlet chamber 42 and this pressure plus gravity seats valve plates 14—14 in their normal or closed position in the inlet valve assembly 21. At the same time, the excess pressure in the cylinder 41 causes the valve plates 14—14 of discharge valve 22 to open, as above described in relation to the operation of inlet valve 21, and the compressed gas enters the discharge chamber 44, as shown by the small arrows, and then on through pipes to the equipment to which the compressed gas is being fed.

The outstanding advantage of the present valve is that the covering valve plates are of heavy rugged construction and break much less frequently than reed type valves under severe use conditions. A further advantage of the valve is that special allov steels are not required in the manufacture of the valve plates. The ease with which the valve can be dismantled and repaired is an outstanding feature of its construction. The particular valve construction illustrated and described in detail is set forth for the purpose of illustration only and not limitation. It will be obvious to those skilled in the art that each valve body may contain one or a plurality of valve ducts in lieu of the two-duct form illustrated. Similarly, the assembled valve may consist of any number of valve bodies in lieu of the three-valve body form illustrated.

I particularly point out and distinctly claim the following to be my invention:

A non-return multiple plate valve comprising in combination a covering member containing valve guide and stop means, a lowermost valve body member, intermediate valve body members, each valve body member comprising at least one valve duct having a fluid inlet, a fluid passageway and a fluid outlet, the fluid outlet being in a plane substantially perpendicular to the fluid inlet and the earth's gravitational force when in operable position, the intermediate valve bodies also containing valve guide and stop means, and a gravity seated valve plate over each of the valve outlets of the valve ducts; means for fixedly positioning the intermediate valve body members in superimposed relationship upon the lowermost valve body member and the covering member upon the uppermost intermediate valve body member, the valve guide and stop means of each intermediate valve body member restricting the movement of the valve plates superimposed over the valve outlets located in the next lowermost valve body member and the valve guide and stop means in the covering member restricting the movement of the valve plates superimposed over the fluid outlets in the uppermost intermediate valve body member.

References Cited in the file of this patent

UNITED STATES PATENTS

| Number | Name | Date |
|---|---|---|
| 1,462,122 | Peterson | July 17, 1923 |
| 1,918,807 | Glab | July 18, 1933 |

FOREIGN PATENTS

| Number | Country | Date |
|---|---|---|
| 724,723 | France | 1932 |